March 23, 1943.　　　　B. W. KEESE　　　　2,314,833
POWER TRANSMITTING MECHANISM
Filed Aug. 3, 1940　　　　5 Sheets-Sheet 5

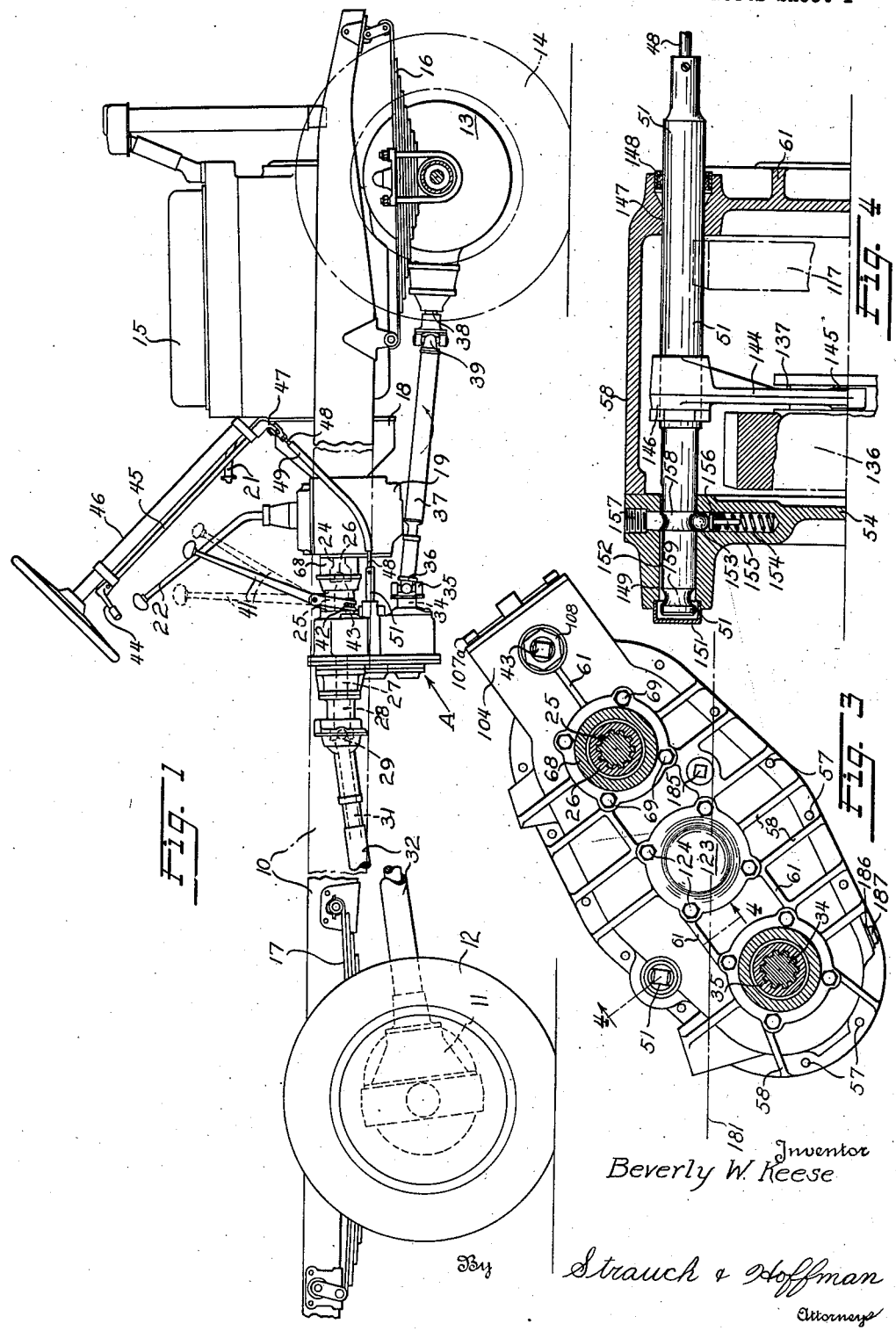

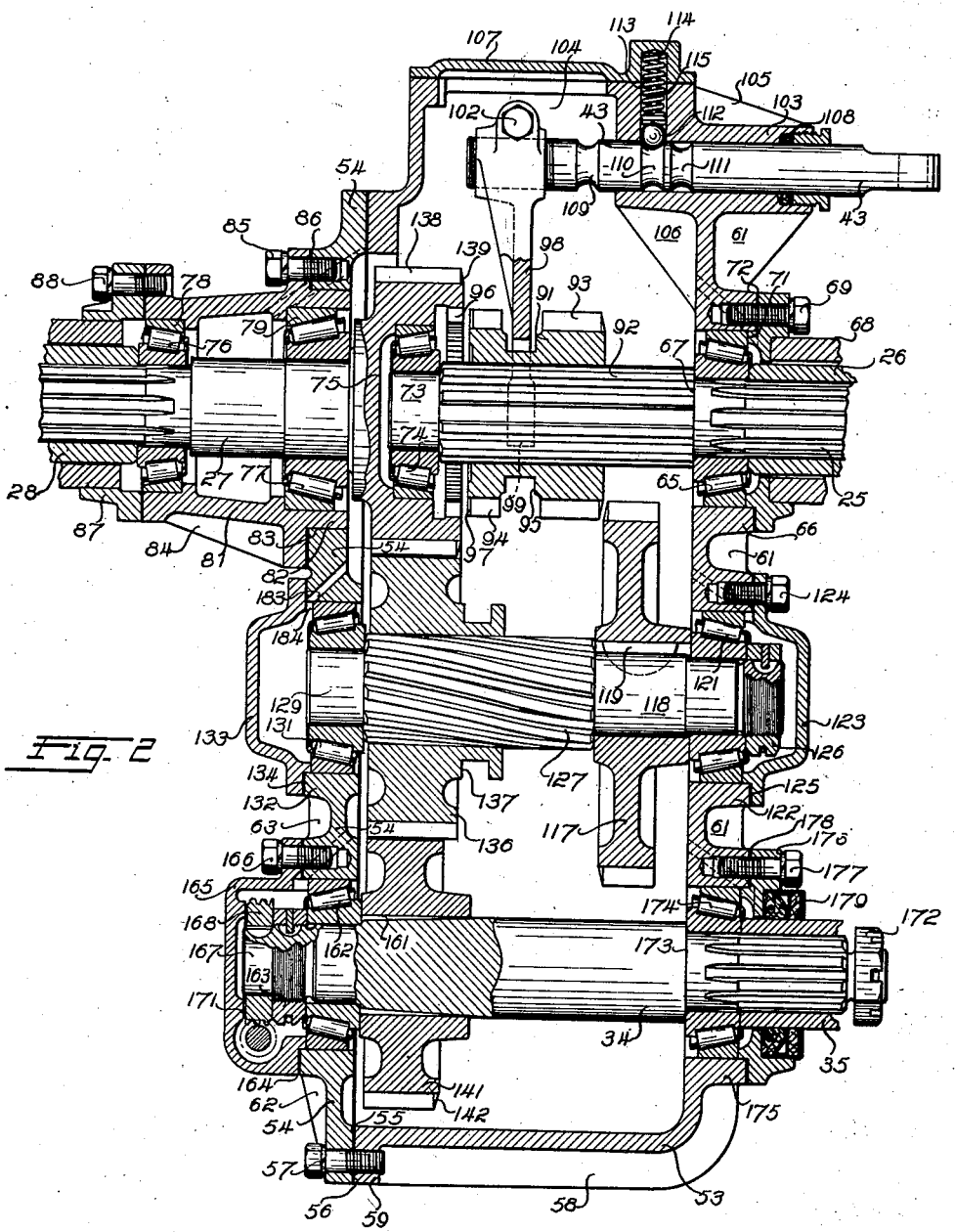

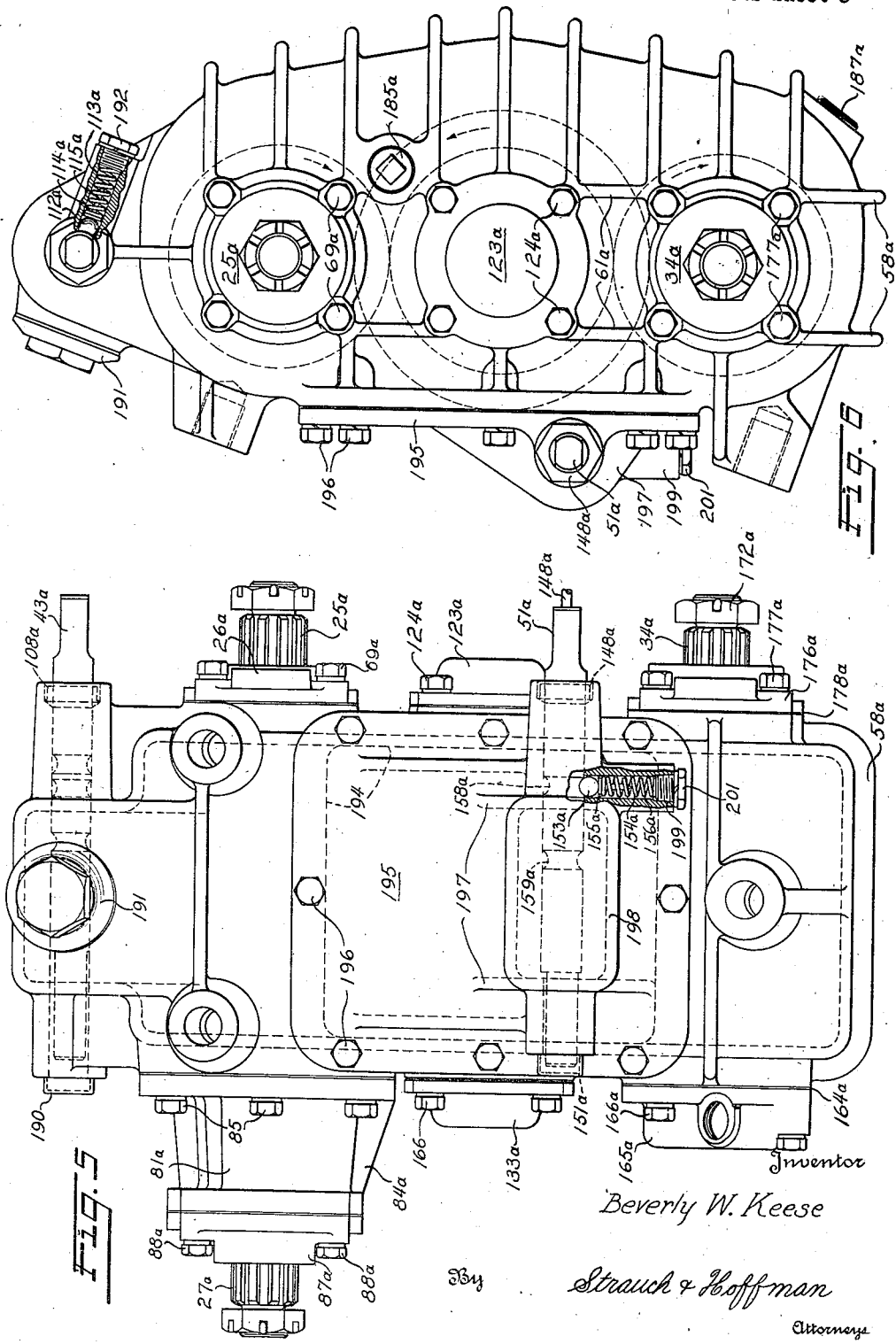

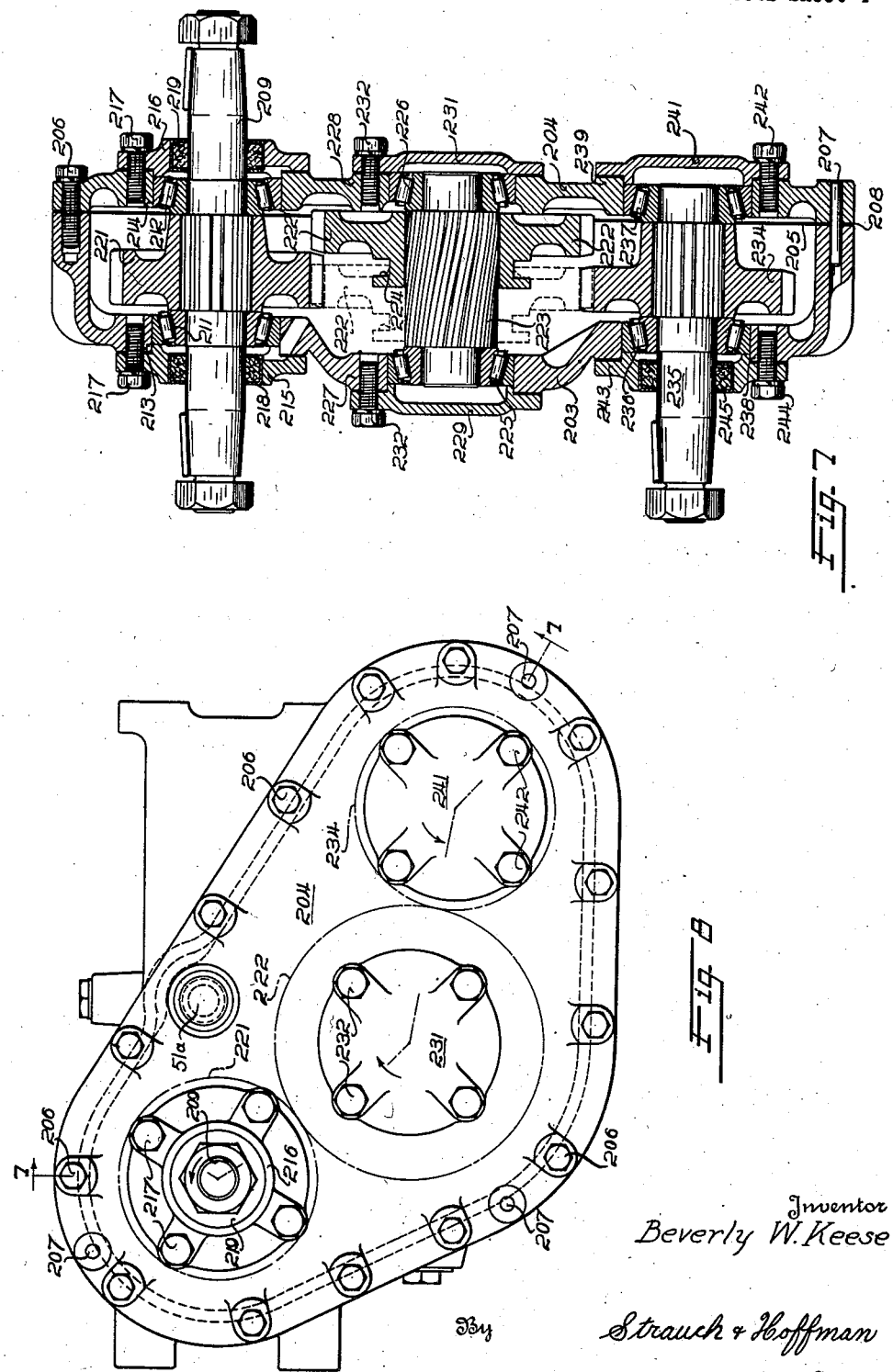

Inventor
Beverly W. Keese

By
Strauch & Hoffman
Attorneys

Patented Mar. 23, 1943

2,314,833

UNITED STATES PATENT OFFICE 2,314,833

POWER TRANSMITTING MECHANISM

Beverly W. Keese, Oshkosh, Wis., assignor to The Timken-Detroit Axle Company, Detroit, Mich., a corporation of Ohio Application August 3, 1940, Serial No. 350,917

11 Claims. (Cl. 74—326)

The present invention relates to power transmitting mechanisms, more particularly to power dividing transmissions for transmitting power to the front and rear wheels of motor vehicles from a single prime mover, and known in the art as transfer cases, although it is not limited to use in this combination and may be advantageously employed to transmit power to the four driven rear wheels of vehicles known in the art as multi-wheelers.

Power dividing transmissions have been heretofore proposed having a gear train for providing an additional speed reduction over that afforded by the conventional transmissions of the vehicles in which they have been used and, since the resulting torque multiplication in low gear was of considerable magnitude, it was necessary to provide interlocking controls to prevent the power from being transmitted through but one of the axles when the divider is in low gear as for instance by interrupting the drive to one of the axles to prevent the other power axle from being subjected to destructive torquing forces.

In Freitag Patent No. 2,174,187, there is disclosed a transfer case for transmitting power at two selective speeds to the two rear axles of a multi-wheel vehicle and it embodies a jaw clutch assembly which makes it unnecessary to employ interlocking controls to prevent the engine from driving only one of the axles when the transfer case is in low gear. This construction, however, is open to the objections that the output shafts are rotated in opposite directions, which makes it necessary to employ right and left-handed drive axles; the driven gears must each be provided with internal gear teeth and sufficient space must be provided between them to allow the jaw clutch to be shifted into its operative and inoperative positions, which results in a comparatively wide structure, the construction is not well adapted to successfully withstand the stresses to which such units are subjected in normal service; and it also employs costly herringbone type gears.

It is accordingly a major object of this invention to provide a transfer case having means for driving the two output shafts in the same direction but at two selectively different speed ratios and is so designed that one output shaft may be disconnected in the high ratio, but power cannot be transmitted to one output shaft alone when the transfer case is operating in the lower speed ratio.

A further important object is to provide a transfer case embodying a countershaft between the two output shafts and carrying a helical gear slidable into and out of mesh with helical gears on the output shafts, the parts being so designed that the slidable gear will not tend to walk out of mesh with the other gears under load, and yet may be shifted into and out of mesh when not under load.

A further object is to provide a transfer case having a gear slidable on a countershaft adapted to be meshed with gears carried by the output shafts, the gears being so designed that partial engagement with one gear is first made, and upon further sliding movement engagement with the other gear is effected, with the result that gear shifting is greatly facilitated.

Another object is to provide a transfer case having a pair of power output shafts and an interposed countershaft carrying a slidable gear which may be shifted to interrupt the drive to one of the output shafts, the parts being so designed that no gears are meshing when the drive is interrupted, which results in an extremely silent and efficient mechanism.

A further object is to provide a two-speed transfer case having a countershaft interposed between the two output shafts and carrying a gear shiftable into a declutching position and operative to interrupt the drive to one of the output shafts when the transfer case is in the high gear ratio and to interrupt the drive to both of the output shafts in the low gear ratio.

The invention also aims to provide a novel drive embodying a declutchable drive axle coupled to a declutchable transfer case by means of a propeller shaft, so that the propeller shaft and associated parts may be immobilized by declutching the axle and transfer case.

A further object is to provide novel drive mechanisms embodying a two-speed transfer case and a declutchable drive axle and having a control mechanism for actuating the controls of the transfer case and drive axle in predetermined sequence, so as to prevent the axle from being declutched when the transfer case is operating in low speed.

Other objects, of a more subordinate nature, are to provide transfer cases having novel housings of rugged construction adapted to stand up under severe service; to provide improved gear and clutch assemblies and control mechanisms therefore, which greatly increase the efficiency of operation; to provide novel bearing and lubrication features, and to provide a novel single speed, declutchable transfer case of simple, rugged, but yet efficient construction.

Further objects will become apparent as the specification proceeds in connection with the annexed drawings, and from the appended claims.

In the drawings,

Figure 1 is a side elevational view, with parts in section, of a motor vehicle embodying one form of transfer case of the invention, and illustrates the transfer case in neutral position and the clutch engaged so as to drive all four wheels of the vehicle;

Figure 2 is a longitudinal sectional view of the transfer case shown in Figure 1;

Figure 3 is an elevational view illustrating the transfer case of Figure 2, as it appears when viewed from the right-hand side of that figure, but on a reduced scale;

Figure 4 is a fragmental sectional view, taken substantially on the line 4—4 of Figure 3, looking in the direction of the arrows;

Figure 5 is a side elevational view of a transfer case somewhat similar to Figures 2 and 3, but having a modified form of housing construction;

Figure 6 is an end view of the transfer case shown in Figure 5 as it appears when viewed from the right-hand side of that figure;

Figure 7 is a longitudinal sectional view of a single speed transfer case also forming part of the invention, taken substantially on the line 7—7 of Figure 8.

Figure 8 is an end elevational view of the transfer case shown in Figure 7, as it appears when viewed from the right-hand side of that figure, and with the shafts in their proper planes;

Figure 9:
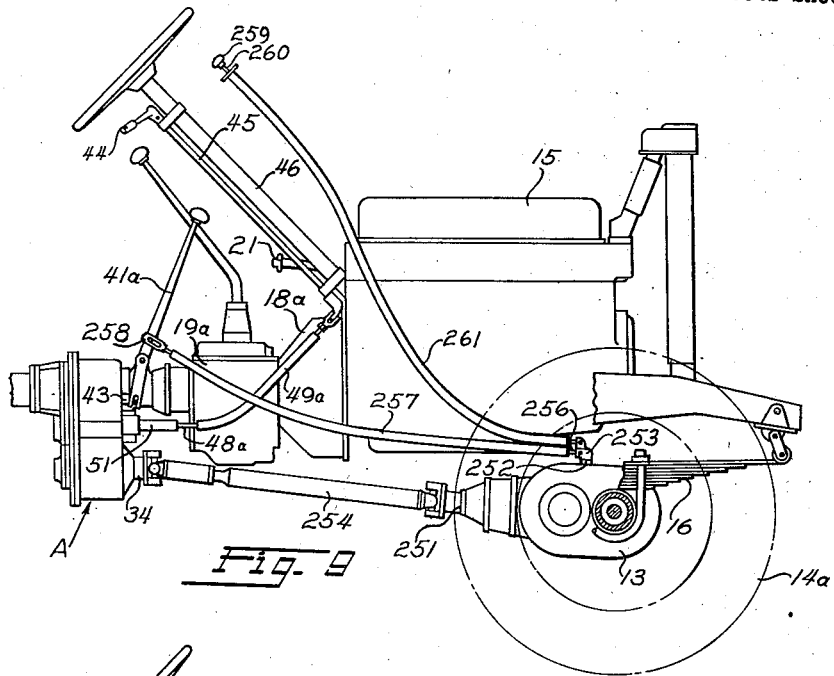
Figure 9 is a fragmental side elevational view of a vehicle having a declutchable front drive axle, in combination with the transfer case of Figures 1, 2 and 3 and novel control means for actuating the elements thereof; and, Figure 10 is a view somewhat similar to Figure 9, but shows a further form of transfer case and front axle control mechanism of the invention.

With continued reference to the drawings, wherein like reference characters have been employed to designate like parts throughout the several views thereof, and referring more particularly to Figures 1, 2 and 3, the power transmitting mechanism of the invention designated A in Figure 1, which will hereinafter be termed the "transfer case," is mounted amidships of a motor vehicle having a chassis frame 10, a single reduction bevel gear rear axle 11 carrying wheels 12 and a single reduction bevel gear front axle 13 having wheels 14.

The front and rear axles are connected to the chassis frame by springs 16 and 17 respectively, in well-known manner.

A conventional internal combustion engine 15 is located at the front of the chassis and is coupled to a clutch 18, and a conventional selective speed transmission 19. Clutch 18 is operated by the usual clutch pedal 21 and transmission 19 is shifted by a gear shift lever 22. Transmission 19 is provided with an output shaft 24 which is coupled to the input shaft 25 of the transfer case by means of a universal joint assembly 26.

The transfer case is provided with a primary output shaft 27, to which is splined a universal joint member 28, and the latter is connected to a mating universal joint member 29 carried by a propeller shaft 31 located in a torque tube 32 and connected to the bevel pinion of rear axle 11 in well-known manner.

The transfer case is provided with a secondary output shaft 34 carrying a universal joint member 35 which is coupled to a mating universal joint member 36 carried by propeller shaft 37. The front end of the propeller shaft is connected to a pinion shaft 38 in the front axle by means of a universal joint assembly 39.

Mounted for fore and aft rocking movement on a chassis in any suitable manner is a shift lever 41, which is forked at its lower end and engages a pin 42 carried by a shift lever 43 mounted for longitudinal movement in the transfer case. With shift lever 41 disposed in the full line position shown, the transfer case parts are disposed in the neutral position shown in Figure 2, as will be more fully explained hereinafter.

The transfer case is also provided with declutching means for disengaging the front axle drive at the will of the operator, and it is actuated by a lever 44 carried by a shaft 45 mounted for rocking movement on the steering column 46 of the vehicle. The lower end of shaft 45 terminates in a lever 47, which is coupled to a cable 48 carried in a flexible sheath 49. Cable 48 and sheath 49 form parts of a well-known Bowden cable construction, and the lower end of the cable is connected to a shift rod 51 slidably mounted in the transfer case and is operative to shift the parts into declutched position. In the condition shown in Figure 1, with lever 44 pulled down, the transfer case is engaged or clutched, so that by operating the clutch 18 and the conventional transmission 19, and shifting lever 41 into the high or low ratio, the vehicle may be driven by all four wheels at any desired gear ratio. When lever 44 is pushed up, so as to move shift rod 51 to the right, the transfer case will be declutched, so that the power transmitted to shaft 25 of the transfer case is transmitted solely to the rear axle in the manner to be hereinafter pointed out. The novel transfer case of the invention will now be described.

The transfer case is shown more particularly in Figures 2, 3 and 4, and it comprises a housing made up of a housing section 53 and a cover section 54 having accurately formed mating faces 55 and 56 respectively, which are clamped in tight engagement by a plurality of cap screws 57.

The housing is preferably provided with a plurality of external strengthening flanges or ribs 58, which extend from a peripheral flange 59, adjacent the mouth of the housing, along the sides of the housing onto the rear face, where they are integrally joined with a plurality of bearing bosses to be hereinafter described. As seen more particularly in Figure 3, a plurality of short ribs 61 interconnect certain of the bearing bosses and some of them are interconnected with certain of the flanges 58, so as to provide an extremely rigid, sturdy structure. The cover is similarly reinforced by a plurality of webs 62 and 63 which extend out to the edge of the cover and interconnect certain of the bearing bosses formed therein.

Input shaft 25 is splined to universal joint member 26 and is journaled at one end in an anti-friction bearing 65 located in a bearing boss 66 in the housing. Universal joint member 26 is secured to the shaft in any well known manner, as by means of a nut, and firmly clamps the inner race of bearing 65 between it and a shoulder 67 on shaft 25.

A universal joint housing member 68 is detachably secured to bearing boss 66 by means of cap screws 69, and is provided with a flange 71 engaging the outer race of bearing 65. Shims 72 may be interposed between housing member 68 and the bearing boss to secure the proper axial position of the shaft and accurate running clearance in bearing 65.

The other end of shaft 25 is provided with a reduced portion 73, which is journaled in an antifriction bearing 74 carried in a recess 75 in an enlarged end of end shaft 27. Shaft 27 is journaled in a pair of bearings 76 and 77 located in a pair of bearing seats 78 and 79, respectively, in a bearing cage 81. Cage 81 is provided with a deep flange 82, which is accurately piloted in a bore 83 in cover 54.

By making housing 81 of considerable length, so as to provide a rather large axial spacing of bearings 76 and 77, and making flange 82 comparatively deep, it cooperates with the housing cover to form an extremely strong bearing support. In order to further increase the rigidity, cage 81 is also provided with radial webs 84. Cage 81 is flanged and rigidly secured to cover 54 by a plurality of cap screws 85, and if desired, a plurality of shims 86 may be interposed between the clamping surfaces to accurately locate the cage on the housing. The outer end of cage 81 is flanged and is secured to a housing member 87 by means of a plurality of cap screws 88.

Driving shaft 25 and primary output shaft 27 are accordingly mounted for independent rotation about aligned axes in the housing and because of the heavy ribbed construction of the housing and cover, and the sturdy construction of cage 84 which is of considerable length and rigidly piloted in the cover, the shafts are accurately maintained in alignment and will not respond to distorting stresses set up during even unusually severe operation of the mechanism. Bearings 76 and 77 are of comparatively large size, so that they may absorb the axial thrusts set up by the gears, as will hereinafter appear.

Input shaft 25 is adapted to be selectively coupled to shaft 27, or to a reducing gear train by means of a combined gear and clutch member 91, which is mounted for axial sliding movement upon splines 92 provided on shaft 25. Member 91 comprises a spur gear 93, a clutch gear 94 and an annular yoke groove 95.

Clutch teeth 94 cooperate with a plurality of internal teeth 96 provided within the enlarged end of shaft 27, teeth 94 being rounded off as indicated at 97 to facilitate clutch engagement. Also, member 91 is adapted to have sufficient axial movement to bring teeth 94, which are wider than teeth 96, into slightly overlapped meshing engagement, so as to secure full surface contact between the teeth; to render the device less susceptible to walking out of high gear; and to also allow substantial relative axial adjustment to the parts to be carried out without impairing the engaging action of the clutch.

The clutch is actuated by means of a yoke 98 having enlarged arms 99 which seat in groove 95 with sufficient clearance to provide a free running fit. Groove 95 is preferably located between the clutch and spur gear portions, so that member 91 will be substantially centrally gripped, and which results in smoother sliding and easier meshing. The yoke is threaded onto shifter rod 43 and is locked in place by a cap screw 102. As seen in Figure 2, shifter rod 43 is mounted for endwise sliding movement in a boss 103 provided in an integral chamber portion 104 of the housing. Boss 103 is reinforced against distorting stresses by webs 105 and 106, and one of the webs 61 interconnects it with bearing boss 66.

The shift rod chamber is closed by a removable plate 107, and a packing gland 108 is associated with rod 43 for preventing the escape of lubricant from the housing. In order to yieldably retain the shift rod in its three shifted positions, it is provided with annular grooves 109, 110 and 111, which cooperate with a detent ball 112 mounted for sliding movement in a bore 113 in the housing, and urged toward the shift rod by means of a spring 114 and a plunger 115. As seen in Figure 2, the upper end of the spring seats in a socket in closure plate 107, so that when the latter is removed the detent assembly may be disassembled.

With detent 112 located in groove 110, as shown in Figure 2, the clutch member is held in its intermediate or neutral position, with no power transmitting connection between input shaft 25 and output shaft 27. When shift rod 43 is located with its groove 111 in engagement with ball 112, clutch teeth 94 will be engaged with teeth 96 of shaft 27, so as to place the transfer case in the high gear or one-to-one power transmitting ratio.

When rod 43 is shifted in the opposite direction, to bring groove 109 into engagement with the detent, gear teeth 93 of the clutch member are brought into meshing engagement with the teeth of a spur gear 117 rigidly secured on a countershaft 118 by means of one or more keys 119 or the like. The hub of gear 117 is abutted by the inner race of a bearing 121, and the outer race of the bearing is secured in a bearing boss 122 by flanged cap 123. The cap is held in place by cap screws 124, and shims 125 may be employed to properly adjust the axial position of shaft 118 and also the running clearance in the bearing. The gear and bearing are restrained against relative axial movement by means of a nut 126, and the ends of a plurality of helical splines 127 provided on shaft 118.

The other end of shaft 118 is provided with a reduced portion 129 which is journaled in a bearing 131 carried in a boss 132 in the cover. The outer race of the bearing is held in place by a flanged cap 133, with a plurality of shims 134 disposed between it and the cover, by cap screws not shown. As seen in Figures 2 and 3 bosses 66 and 122 are joined by webs 61, so as to provide an extremely rigid construction.

An internally helically splined gear 136 is mounted for axial sliding movement on shaft 118 and is provided with a yoke groove 137. Gear 136 is provided with helical teeth of the same lead and pitch of splines 127, so that any axially directed forces set up in the gear during operation are exactly neutralized or counteracted by splines 127, and the gear manifests no tendency to shift axially under any condition of operation. Gear 136 meshes with helical gear teeth 138 provided on the enlarged portion of shaft 27, and as seen in Figure 2, teeth 138 have bevelled and rounded ends 139 to facilitate the meshing of the gears.

Gear 136 is also adapted to simultaneously mesh with a helical gear 141 mounted on the secondary output shaft 34. As seen in Figure 2, gear 141 is narrower than gear 136 for a purpose that will presently appear, and the gear teeth are provided with bevelled and rounded ends 142 in order to facilitate meshing engagement with gear 136.

By reason of the novel gear mechanism just described, gears 93 and 117 provide a reduced speed drive between shafts 25 and 118, and by shifting member 91 to the right of the position shown in Figure 2, into engagement with gear 117, the primary output shaft 27 and secondary output shaft 34 are driven at equal speeds when gear 136 is meshed with gears 138 and 141.

Gears 138 and 141 have an equal number of teeth, but they are driven at a reduced speed ratio with respect to input shaft 25, because gear 117 has a greater number of teeth than gear 93.

Since gears 136, 138 and 141 are helical, the drive is extremely silent in the high gear ratio or direct drive, and although gears 93 and 117 are of the spur type and will cause the transfer case to emit a characteristic noise in low gear, this is desirable to give the operator an indication that the transfer case is operating in the lower gear, so that he will shift into high gear as soon as road conditions permit.

Since the torque multiplication produced by gears 93 and 117, when multiplied by the low gear ratios in transmission 18, will, in most vehicles, produce a tremendous torque, it is highly desirable that the vehicle be driven through both the front and rear axles when the transfer case is operating in the low gear ratio.

This invention makes it impossible to operate the transfer case in the low gear ratio without driving both axles, because, if gear 136 is shifted axially to the right, so as to disengage it from gear 141 of the front wheel drive shaft 34, it is also substantially simultaneously disengaged from gear 138 to the rear axle, and thereby completely interrupts the drive. The novel transfer case accordingly drives the front and rear axle propeller shafts in the same direction, and automatically disrupts the drive to the front and rear axle when it is declutched in low gear, thereby effectively preventing overloading the rear axle.

Any suitable means may be employed for shifting gear 136 into its two axial positions, but I preferably employ the mechanism shown in Figure 4, comprising a shift yoke 144 having enlarged arms 145 cooperating with yoke groove 137 of gear 136. The yoke is preferably threaded onto the rod and locked in place by a lock nut 146. The front end of rod 51 extends through an opening 147 in the housing and seal assembly 148. The other end of rod 51 is slidably mounted in a bore 149 in cover 54, which is closed by a cap 151. A groove 152 prevents pneumatic pressures from developing inside of cap 151 in response to shifting movements of the rod.

The rod is adapted to be held in its two shifted positions by a ball detent 153, which is urged toward the rod by means of a compression spring 154 and a plunger 155, operating in a bore 156 in the cover. The upper end of the bore is closed by a plug 157. Detent 153 cooperates with a pair of annular grooves 158 and 159 in the shifter rod to yieldably hold the gear in either of its two positions. In the position shown in Figure 4, with ball 153 disposed in groove 158, the gear is held in its lefthand or engaged position as shown in Figure 2, and establishes a one-to-one drive between the two output shafts.

From the structure so far developed, it is apparent that by pulling lever 44 down, into the position shown in Figure 1, the parts will be shifted into the position shown in Figures 2 and 4, with gear 136 in engagement with gears 138 and 141 and, by rounding the teeth of the two gears to be engaged, the shifting operation is greatly facilitated. Also, by making gear 141 narrower than gear 138, when the gear 136 is shifted to the left, it initially engages gear 138 and then slightly later it engages and picks up gear 142. This is highly advantageous. For instance, assuming that member 91 is shifted to the left, so as to place the transfer case in high gear or direct gear, and gear 136 is disposed in its right hand position, initial movement thereof to the left will cause it to be first picked up by gear 138, which is rotating by virtue of engagement of teeth 96 with teeth 94, and is thus brought up to speed before it is brought into mesh with gear 141. Otherwise, if the gears were all of equal width, and the teeth of gear 136 should become blocked with the teeth of gear 141, it would be extremely difficult to bring them into mesh, especially if the vehicle was not in motion.

Gear 141 is preferably secured to shaft 34 by means of a tapered spline connection 161, and it is forced on the shaft by the inner race of a bearing 162 and a nut 163. Bearing 162 is supported in a bearing boss 164 in the cover, and is secured in place by a flanged cap 165 and cap screws 166. The shaft is also provided with a reduced portion 167 on which is keyed a speedometer gear 168, which cooperates with a speedometer drive (not shown) in any well known manner. Gear 168 is restrained against axial displacement from shaft 134, by means of an annular boss 171 formed in cap 165.

The other end of shaft 34 has a spline connection with universal joint member 35, and is secured thereto by nut 172. Clamped between member 35 and a shoulder 173 on the shaft is the inner race of bearing 174, the outer race being supported in a bearing boss 175 in the housing. A flanged ring 176 engages the outer races of the bearing and is held in place on the boss by cap screws 177, and sufficient shims 178 are interposed between the ring and the housing to secure the proper bearing adjustment. Ring 176 also carries a seal assembly 179, which cooperates in sealing engagement with the outer surface of joint member 35 and prevents the escape of lubricant from the housing.

The transfer case of the invention accordingly efficiently rotates the driven shafts in the same direction by reason of the novel countershaft assembly and the use of anti-friction bearings throughout; is extremely rigid and adapted to successfully sustain heavy loads in service through the use of a housing made up of heavily ribbed housing and cover sections rigidly joined in accurately mating relationship; is extremely silent in high gear, through the use of helical gears, and yet which may be readily engaged and disengaged through the use of a helically splined countershaft, rounded teeth corners and a gear on the bottom driven shaft which is narrower than the top gear; and embodies a novel gear relationship which makes it impossible to transmit power to only one output shaft when the transfer case is in the low gear ratio.

Efficient lubrication to all of the working parts is provided by maintaining a body of lubricant in the housing approximately at the level indicated by the line 181 in Figure 3, the transfer case being shown in that figure in the approximate position it assumes in the vehicle. Since shaft 34 is directly connected to the front axle by propeller shaft 37 at all times, irrespective of whether gear 136 is engaged with gear 141, and accordingly is constantly rotated while the vehicle is under way, it will continuously splash lubricant into the upper part of the chamber and efficiently lubricate those parts at all times.

In order to further insure efficient lubrication of all the bearings, the bearing bosses are all bored to provide passages 183, which communicate with notches 184 provided in the flanges of each cap, so that lubricant thrown upwardly in the housing will, in gravitating down the sides of the interior, find its way into each passage 183 and pass through notches 184 into the interior of the various caps and then flow through the bearing back into the housing, thereby efficiently lubricating the bearings at all times. It is to be understood that in Figure 2 the lubricant passages are shown somewhat out of their actual plane and that in the actual construction they are disposed over each of the bearings. Lubricant may be introduced into the housing through an opening closed by a filter plug 185 and the lubricant may be periodically drained from the case through an opening 186 in the bottom of the case closed by a plug 187.

The transfer case may be supported in the vehicle in any suitable manner, preferably upon resilient mounts (not shown).

The transfer case is assembled as follows: Assuming that the cover and housing sections are separated, shafts 25, 118 and 34, with their gears and bearings 65, 121 and 174, respectively, in place thereon, are inserted endwise into the housing into their proper bearing seats. Cage 81 is bolted in place, and shaft 27, with bearings 74 and 77 in place thereon, is then inserted in the cage, bearing 76 slipped over the end of the shaft and the universal joint member 28 applied and adjusted to secure the proper running clearance. The cover is then applied to the housing, with reduced portion 73 of shaft 25 fitting into bearing 74, and with the bearings of shafts 118 and 34 finding their proper seats in the cover. Housing 68 and caps 123, 133, 165 and 176 are then applied, with sufficient shims in place to secure the proper axial adjustment of the shafts and the proper running clearance in the bearings. At the time the cover is applied, shifter yoke 144 is also applied to gear 136 and secured to shift rod 51.

Yoke 98 is now inserted through the opening of chamber 104 and attached to shaft 43. Closure 107 is then applied, with the detent assembly in place. Lubricant is then introduced into the housing and the transfer case is ready for use.

Referring now to Figures 5 and 6, there is shown a modified form of transfer case, the major difference residing in the use of an integral one-piece, rather than a two-piece housing, as employed in the previously described form of transfer case, and the same reference characters, with the subscript $a$ applied, will be employed to designate similar or corresponding parts.

In this form of the invention, the housing is integrally cast in one piece, and all of the bearing and piloting surfaces are machined directly therein, and bearing cage 81a and caps 26a, 123a, 133a, 165a and 176a are secured directly to the housing. In this instance, however, input shaft 25a and output shaft 27a are adapted for direct connection to unhoused universal joint assemblies and therefore housings 26a and 87a terminate as ring members and, in addition to maintaining the outer bearing races in place, they also contain seal assemblies which cooperate with the universal joint members to prevent lubricant leakage from the housing, in well known manner.

In this construction, the chamber for shifter rod 43a is also formed as an integral part of the housing, and no closure is utilized, aside from a small opening closed by a detachable plug 191, and through which cap screw 102 may be manipulated to effect the assembly of shifter rod 43a with the yoke (not shown). Also, detent 112a is mounted in the bore 113a in the housing containing spring 114a and plunger 115a, and it is closed by a plug 192 which abuts the outer end of the spring.

In order to provide for ready assembly of the gears within the housing, one side of the housing is provided with a large opening 194 closed by a cover 195, which is rigidly secured in place on the housing by cap screws 196. Since cover 195 is comparatively rigid of truss-like form, and is securely fastened to the housing, the resultant construction is just as strong as though the housing had an unbroken side wall. To further stiffen the cover, it is reinforced by a pair of webs 197, which merge into a tubular casing construction 198. Shift rod 51a is mounted for sliding movement in casing 198 and in this instance detent 153a is located in a bore 156a in a boss 199 on the cover. A closure plug 201 is threaded into boss 199 and bears against spring 154a.

Detent 153a cooperates with grooves 158a and 159a in shift rod 51a to maintain the latter in the clutching and declutching position, as previously described.

The housing is externally ribbed in somewhat the same manner as the transfer case previously described, except that in this instance, by reason of the integral construction, ribs 58a may extend from side-to-side of the housing, thereby providing additional strength.

The one-piece housing just described accordingly provides great strength with a minimum of weight, accurately maintains shafts and gears in accurate alignment, and yet does not add to the weight of the device. Also, by removing cover 195, complete installation of all the internal parts of the mechanism may be made, and since the shifter mechanism for gear 136 is built into the cover, assembly of the yoke with the cover may be made before the latter is applied to the housing, thereby rendering the assembly operation extremely easy.

It is also to be understood that if desired, shift rod 43a may be located approximately ninety degrees from the position shown in Figure 6, and also mounted for sliding movement in cover 195 parallel to shift rod 51a without departing from the spirit of the invention. In such case the opening closed by plug 191 may be omitted, and spring 154 relocated one hundred and eighty degrees from the position shown in Figure 5 and utilized to also urge a detent ball into cooperation with grooves 109, 110 and 111 of shift rod 43, thereby eliminating spring 115a and facilitating assembly of the mechanism.

In Figures 7 and 8 there is disclosed a further modified form of the invention, in which the transfer case provides a one-to-one drive between transmission 18 and the front and rear axles of the vehicle, and may be shifted to cut out the front wheels, but does not embody a second speed or a speed reducing drive. It is primarily adapted for light vehicles or vehicles having a transmission providing the requisite degree of torque multiplication to handle all the loads encountered in normal operation.

In this form of the invention the housing is made up of a housing section 203 and a cover section 204, which are secured together along a joint 205 by means of a plurality of cap screws 206. A plurality of dowels 207 are preferably employed to properly locate the cover with respect to the housing. A gasket 208 is preferably interposed between the housing and cover to seal the parts against leakage.

In this form of transfer case a power input shaft 209 extends completely through the housing and is journaled in bearings 211 and 212 located in bearing bosses 213 and 214 respectively in the housing and cover. The ends of the shaft are tapered and provided with keys for connection to universal joints or any other desired power transmitting units. Bearings 211 and 212 are held in place in the housing by flanged rings 215 and 216 respectively which are held in place by cap screws 217, and embody seal assemblies 218 and 219, respectively, for preventing the escape of lubricant from the housing.

Splined on shaft 209, and clamped between the inner bearing races, is a helical gear 221 which is adapted to mesh with a helical gear 222 splined on a countershaft 223. As seen in Figure 7, the splines on the countershaft are helical and the lead and pitch of the splines are preferably substantially equal to the lead and pitch of the helical teeth of gear 222, so that during operation any axially directed forces developed in gear 222 are exactly neutralized by the splines, and the gear will not tend to walk in either direction on the shaft.

Gear 222 is provided with a shifter yoke groove 224 with which a shifter yoke cooperates to shift gear 222 from the full line position to the dotted line position shown in Figure 7.

The ends of shaft 223 are reduced in section and journaled in bearings 225 and 226 carried by bearing bosses 227 and 228 of the housing and cover respectively. The bearings are maintained in proper assembled position in the bearing bosses by a pair of flanged caps 229 and 231 secured in place by cap screws 232.

Gear 222 is also adapted to mesh with a helical gear 234 splined on an output shaft 235. Gear 234 is abutted by the inner races of a pair of anti-friction bearings at 236 and 237, located in bosses 238 and 239 on the housing and cover respectively. The outer race of bearing 237 is engaged by a flanged cap 241 held in place by cap screws 242. The outer race of bearing 236 is engaged by a flanged ring 243, which is held in place by cap screws 244 and embodies a seal assembly 245 cooperating with shaft 235 to prevent lubricant from escaping from the housing. The end of shaft 235 is tapered and provided with a key for connection to a universal joint or any other power transmitting unit.

Since a single top shaft 209 is employed in this form of transfer case, power may be applied to either end thereof. In the present instance, however, it is to be assumed that power will be applied to the left hand end of the shaft from the usual transmission in a manner similar to Figure 1, and bottom shaft 235 will be employed to transmit power to the front axle.

Since the leading ends of the teeth of gears 221, 222 and 234 are bevelled off, they may be readily brought into meshing engagement, and since gear 234 is narrower than gear 221, it will pick up gear 222 first when the latter is shifted to the left of the full line position in Figure 7, and slightly later it will mesh with gear 234. The structure accordingly possesses the improved shifting characteristics of the previously described forms of the invention. Also, the helical gears make for extremely silent, efficient transmission of power, and yet the helical splines on shaft 223 counteract any tendency of the idler gear 222 to shift axially in either direction under load. In all forms of the invention the splines are preferably of involute form, so that when they are transmitting power they will automatically manifest a cam action and accurately center the gears, and yet will permit free shifting of the idler when no power is being transmitted.

Since the shifter rod is mounted for sliding movement in the housing and cover in substantially the same manner as shown in Figure 4, and is yieldably held in its shifted positions by a similar resilient detent, no further disclosure thereof will be made.

Although the transfer cases of the invention have been disclosed as adapted for four wheel drive vehicles, with the output shafts extending from opposite sides of the casing and adapted to be connected to the front and rear axles, respectively, it is to be understood that if desired they are also useful in other power transmitting relationships. For instance they may be mounted forwardly of a dual rear axle drive unit for dividing the power between the two axles of such unit, the only change required in the transfer cases residing in allowing both power output shafts to project out of the same side of the housing, and the appended claims are intended to embrace the novel power transmitting mechanisms of the invention when they are utilized in this manner.

In Figure 9 I have shown a vehicle somewhat similar to Figure 1, including the transfer case of Figures 2, 3 and 4, but embodying a somewhat different front axle and having novel means for correlating the operation of the front axle declutching means with the operation of the transfer case.

The engine 15a is connected to the transfer case by a clutch 18a and a transmission 19a as before, but the front axle is of the double reduction type shown in the application of Herbert W. Alden, Serial No. 357,801 for Motor vehicle, filed September 21, 1940, and briefly comprises a drive shaft 251 carrying a bevel pinion which drives a bevel gear fixed to a countershaft, and the latter carries a spur gear which meshes with a spur gear on the differential carrier. A jaw clutch, slidable on the countershaft, is adapted to engage clutch teeth on the helical gear, to couple it to the countershaft and is actuated by a yoke having a shaft 252 projecting out of the top of the casing and carrying a lever 253. Drive shaft 251 is connected to output shaft 34 of the transfer case by a propeller shaft 254 and a pair of universal joints.

Shift rod 51, for shifting the idler into declutched position is operated by a flexible cable 48a from the steering column as before. In this instance, however, the clutch of the front axle is interconnected with the transmission gear shift lever 41a, so that the front axle cannot be declutched when the transfer case is in low gear, as follows:

A flexible cable 256 is connected to lever 253 and is housed in a flexible sheath 257. By pulling back front cable 256 the front axle may be clutched, and by shoving it forward the clutch may be disengaged. The other end of cable 256 carries a member 258 having a pin slot connection with lever 41a, the latter being shown in neutral position.

The front axle clutch is also adapted to be operated from the vehicle cab by a knob 259 carried by a cable 260 which is housed in a sheath 261. The lower end of cable 260 is also connected to lever 253, so that by pulling knob 259 outwardly, the front axle clutch may be engaged, and by shoving it in it may be disengaged.

The parts are so arranged that when the lever 41a in the position shown in Figure 9, the transfer case is in neutral, and the front axle clutch is disengaged. Lever 41a may be rocked forwardly to shift the transfer case into high gear as previously described, and during this motion no movement of cable 256 occurs, because of the pin and slot connection. When lever 41a is rocked rearwardly of the position shown in Figure 9, to place the transfer case in low gear as previously described, cable 256 is pulled rearwardly to engage the front axle clutch, and the assembly accordingly prevents the vehicle from being driven only through the rear axle when the transfer case is in low gear.

When the transfer case is operating in the high gear ratio, lever 44 may be pushed up to disengage gear 136 from gear 141 and thereby disconnect the front axle, in the manner previously described. Also, when operating in high gear, knob 259 may be pushed in to disengage the front axle clutch, the pin and slot connection in member 258 permitting cable 256 to move rearwardly without interference from lever 41a. Should the knob be pushed in while the vehicle is in low gear it will declutch the front axle and also restore lever 41a to neutral position. In this manner, propeller shaft 254 may be completely freed of rotational efforts and will become immobile or dead, thereby saving wear of the parts when operating in high gear.

Figure 10:
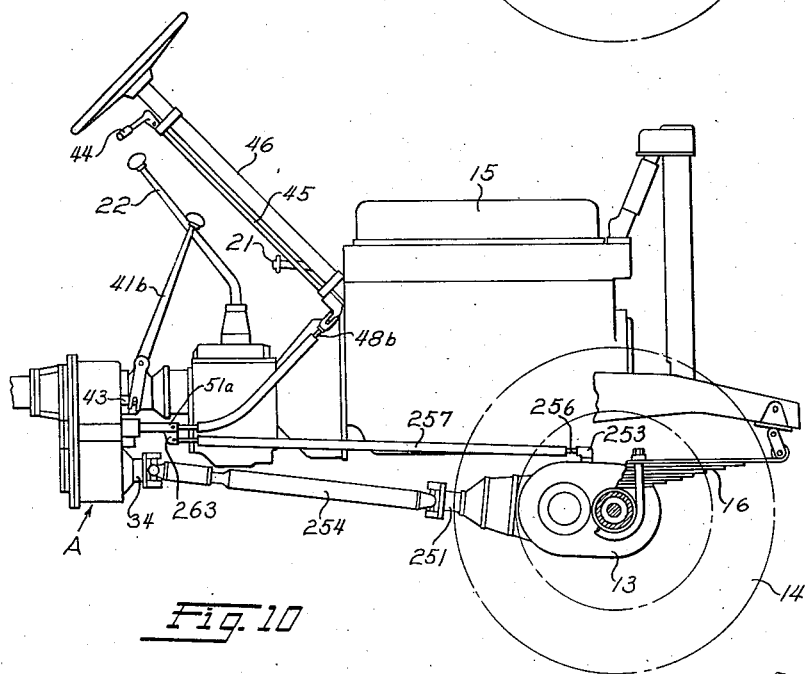

If desired, the front axle declutch may be actuated in unison with the transfer case, and the separate hand control 259 eliminated. In Figure 10 I have shown an assembly of this character. A modified form of shift rod 51a is employed having an enlarged head 263. Cable 48 is connected to head 263 and is actuated by hand lever 44 as previously described. Cable 256 is shortened and secured directly to head 263, so that the front axle and transfer case clutches are actuated simultaneously. That is, when gear 136 is shifted into the position shown in Figure 2, to establish a drive between output shafts 27 and 34, cable 256 is pulled rearwardly so as to engage the clutch of the front axle.

Accordingly, whenever lever 44 is pushed up, the transfer case is coupled to the front and rear axles, and when it is pulled down the transfer case is disconnected from propeller shaft 254, and the latter is also uncoupled from the front axle, so that it may come to rest.

Assuming that it is desired to operate in low gear, lever 41b is pulled back to engage gear 93 with gear 117, and lever 44 is pulled down to engage the transfer case and front axle clutches. The vehicle is accordingly driven through all four wheels, and, if it is desired to shift the transfer case into high gear and maintain the four-wheel drive relationship, lever 41b is merely shifted forwardly of the position shown in Figure 10 to engage gear 93 with internal teeth 96. If, while operating in high gear as just described, it is desired to drive only the rear wheels, lever 44 is pushed up to shift gear 136 out of mesh with gears 138 and 141, and to disengage the front axle clutch.

The construction just described accordingly allows the propeller shaft to come to rest unless the front wheels are actually being driven, and, by reason of the novel interconnections between the front and rear axle clutches, power is always transmitted to both the front and rear axles when the transfer case is in low gear.

Although I have disclosed specific forms of control mechanisms for correlating the action of the various parts of the mechanisms shown in Figures 9 and 10, it is to be understood that any other suitable form of mechanism for producing the proper actuation of the parts may be employed without departing from the spirit of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, a housing; an input shaft and a primary output shaft disposed in axially aligned relationship and journaled for independent rotation in said housing; a secondary output shaft in said housing parallel to said first-named shafts and journaled for rotation; a countershaft mounted for rotation in said housing about an axis substantially parallel to said input and output shafts; and gearing means in said housing and operably associated with said shafts for selectively transmitting power from said input shaft to said output shafts at a high speed ratio and a low speed ratio; said gearing means embodying an element axially shiftable on said countershaft to an inoperative position, said element being operable to interrupt the drive to said secondary output shaft when said gearing means is in the high speed ratio, and also being operable to interrupt the drive to both said primary and secondary output shafts when said gearing means is in the low speed ratio.

2. In a power transmitting mechanism, a housing; an input shaft and a primary output shaft disposed in axially aligned relationship and journaled for independent rotation in said housing; a secondary output shaft in said housing parallel to said first-named shafts and journaled for rotation; a countershaft mounted for rotation in said housing about an axis substantially parallel to said input and output shafts; and gearing means in said housing and operably associated with said shafts for selectively transmitting power from said input shaft to said output shafts at high speed ratio and a low speed ratio; said gearing means embodying a gear axially shiftable to an inoperative position, said gear being operable to interrupt the drive to said secondary output shaft when said gearing means is in the high speed ratio; and also being operable to interrupt the drive to both said primary and secondary output shafts when said gearing means is in the low speed ratio.

3. In a power transmitting mechanism, a housing; an input shaft and a primary output shaft disposed in axially aligned relationship and journaled for independent rotation in said housing; a secondary output shaft in said housing parallel to said first-named shafts and journaled for rotation; a countershaft mounted for rotation in said housing about an axis substantially parallel to said input and output shafts; and gearing means in said housing and operably associated with said shafts for selectively transmitting power from said input shaft to said output shafts at a high speed ratio and a low speed ratio; said gearing means embodying gears on said output shafts meshing with a gear on said countershaft, said countershaft gear being axially shiftable to an inoperative position, and operable to interrupt the drive to said secondary output shaft when said gearing means is in the high speed ratio, and also being operable to interrupt the drive to both said primary and secondary output shafts when said gearing means is in the low speed ratio.

4. In a power transmitting mechanism, a housing; an input shaft and a primary output shaft journaled for independent rotation in said housing; a secondary output shaft in said housing; a countershaft mounted for rotation in said housing; and two sets of gears in said housing operably associated with said shafts for selectively transmitting power from said input shaft to said output shafts at a high speed ratio and a low speed ratio; one of said sets of gears being operable to transmit power between said output shafts and embodying an axially slidable gear on said countershaft and operable to establish a drive between said output shafts when said other set of gears is in the low speed ratio.

5. In a power transmitting mechanism, a housing; a power input shaft and an axially aligned primary output shaft journaled for independent rotation in said housing; a secondary power output shaft mounted for rotation in said housing and disposed substantially parallel to said first named shafts; a countershaft journaled between said primary and secondary output shafts, an axially slidable driving gear on said input shaft; a gear rigidly fixed to said primary output shaft; a gear fixed to said secondary output shaft; an intermediate gear mounted for axial sliding movement on splines on said countershaft and adapted to be meshed with said gears on said output shafts; a spur gear fixed to said countershaft and adapted to be engaged by said driving gear; means for shifting said driving gear into and out of mesh with said spur gear on said countershaft and into and out of engagement with clutch teeth on said primary output shaft; and means for shifting said intermediate gear into and out of substantially simultaneous mesh with said gear on said primary output shaft and said gear on said secondary output shaft.

6. In a power transmitting mechanism, a housing; a power input shaft and an axially aligned primary output shaft journaled for independent rotation in said housing; a secondary power output shaft mounted for rotation in said housing and disposed substantially parallel to said first named shafts; a countershaft journaled between said primary and secondary output shafts, an axially slidable driving gear on said input shaft; a helical gear rigidly fixed to said primary output shaft; a helical gear fixed to said secondary output shaft; a helical intermediate gear mounted for axial sliding movement on helical splines on said countershaft and adapted to be meshed with said first named helical gears; a spur gear fixed to said countershaft and adapted to be engaged by said driving gear; means for selectively shifting said driving gear into and out of mesh with said spur gear on said countershaft and into and out of engagement with clutch teeth provided on said primary output shaft; and means for shifting said intermediate gear into and out of substantially simultaneous mesh with said helical gear on said primary output shaft and said helical gear on said secondary output shaft.

7. In a power transmitting mechanism, a housing; a pair of output shafts journaled for rotation in said housing; a countershaft in said housing and mounted for rotation adjacent said output shafts; a gear fixed to each of said output shafts; a gear mounted for axial sliding movement on said countershaft into meshing engagement with said first named gears, for effecting simultaneous rotation of all of said shafts, said first named gears being so positioned on said output shafts that the entering ends of the teeth of one of said output shaft gears are axially offset from the plane of the entering ends of the teeth of the other output shaft gear, whereby said driving gear, when shifted axially, will first engage one and then the other of said driven gears.

8. In a power transmitting mechanism, a housing; a pair of output shafts journaled for rotation about spaced axes in said housing; a countershaft in said housing and mounted for rotation adjacent said output shafts; a spur gear fixed to each of said output shafts; a driving gear mounted for axial sliding movement on said countershaft into meshing engagement with said spur gear, for effecting simultaneous rotation of all of said shafts, one of said spur gears being narrower than the other, and so positioned on its output shaft that the entering ends of its teeth are offset axially from a plane containing the entering ends of the teeth of the other output gear, whereby said driving gear, when shifted axially, will first engage one and then the other of said spur gears.

9. In a power transmitting mechanism, a housing; an input shaft and an output shaft mounted for rotation about substantially parallel axes in said housing, said input shaft projecting through opposite sides of said housing and adapted to have power applied to one end and to have power taken off the other end; helical gears rigidly carried by said input and output shafts; a countershaft mounted for rotation in said housing adjacent said input and output shafts; a helical gear carried by helical splines on said countershaft and adapted to be shifted axially into mesh with the gears on said input and output shafts so as to effect simultaneous rotation of all of said shafts, said splines being so inclined as to substantially neutralize any axially directed thrusts developed in said countershaft gear during operation, and the entering ends of the teeth on the input shaft gear being axially offset from plane containing the entering ends of the teeth of the output shaft gear, so that the countershaft gear, when shifted axially, will first engage one and then the other of said input and output shaft gears.

10. In a transfer case, a housing having integrally formed end and side walls; a driving shaft journalled in one of said end walls; a driven shaft axially aligned with said driving shaft and journalled in the opposite end wall of said housing; a power output shaft journalled in the end walls of said housing and disposed substantially parallel to said driving and driven shafts; a countershaft journalled in said housing between said driving and driven shafts and said output shaft; gearing means for transmitting power from said driving shaft to said output shaft, comprising an axially slidable member on said countershaft; said housing being completely closed except for an opening in a side wall thereof opposite said countershaft of sufficient area to permit all of the parts of said gearing means to be introduced therethrough; a closure secured over said opening; and a control element mounted for axial sliding movement on said closure for controlling said axially slidable member on said countershaft.

11. In a power transmitting mechanism, a housing; an input shaft and a primary power output shaft disposed in axially aligned relationship and journalled for independent rotation in said housing; a secondary output shaft in said housing parallel to said first-named shafts and journalled for rotation; a countershaft mounted for rotation in said housing about an axis substantially parallel to said input and output shafts; and gearing means in said housing and operably associated with said shafts for selectively transmitting power from said input shaft to said output shafts at a high speed ratio and a low speed ratio, said gearing means embodying a helical gear axially shiftable on helical splines on said countershaft to an inoperative position, said gear being operable to interrupt the drive to said secondary output shaft when said gearing means is in the high speed ratio, and also being operable to interrupt the drive to both said primary and secondary output shafts when said gearing means is in the low speed ratio; said helical countershaft gear being meshable with helical gears on said primary and secondary output shafts, and said countershaft splines having a helix angle substantially equal to the helical pitch of the countershaft gear, for neutralizing any axially directed thrusts developed in said countershaft gear during normal operation and preventing it from working out of engagement under load, said helical gears on said output shafts having the entering ends of their teeth disposed in axially spaced planes, whereby when said helical countershaft gear is shifted axially it will first engage one and then the other of said output shaft gears.

BEVERLY W. KEESE.